(12) United States Patent
Chhabra (10) Patent No.: US 8,856,873 B2
(45) Date of Patent: *Oct. 7, 2014

(54) METHOD, APPARATUS, AND SYSTEM FOR SENDING CREDENTIALS SECURELY

(75) Inventor: Jasmeet Chhabra, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/562,054

(22) Filed: Jul. 30, 2012

(65) Prior Publication Data

US 2013/0191888 A1    Jul. 25, 2013

Related U.S. Application Data

(63) Continuation of application No. 12/058,844, filed on Mar. 31, 2008, now Pat. No. 8,234,697.

(51) Int. Cl.

| | |
|---|---|
| *H04L 9/32* | (2006.01) |
| *H04L 29/06* | (2006.01) |
| *G06F 9/445* | (2006.01) |
| *G06Q 20/34* | (2012.01) |
| *G06Q 20/40* | (2012.01) |
| *G06F 21/83* | (2013.01) |
| *G06F 21/32* | (2013.01) |
| *G06Q 20/38* | (2012.01) |
| *G07F 19/00* | (2006.01) |
| *G06Q 20/10* | (2012.01) |
| *G06F 21/31* | (2013.01) |

(52) U.S. Cl.
CPC .......... *H04L 63/08* (2013.01); *H04L 63/1483* (2013.01); *G06F 9/44526* (2013.01); *G06Q 20/35765* (2013.01); *G06Q 20/40* (2013.01); *H04L 63/166* (2013.01); *G06F 21/83* (2013.01); *G06F 21/32* (2013.01); *G06Q 20/356* (2013.01); *G06Q 20/382* (2013.01); *G07F 19/208* (2013.01); *G06Q 20/3567* (2013.01); *G06Q 20/10* (2013.01); *G06F 21/31* (2013.01)
USPC .................. 726/2; 726/3; 726/4; 726/5; 726/6

(58) Field of Classification Search
USPC .................. 726/2–7; 713/168–170, 182–186; 709/225, 228–229
See application file for complete search history.

(56) References Cited

U.S. PATENT DOCUMENTS

| | | | |
|---|---|---|---|
| 6,212,561 B1 * | 4/2001 | Sitaraman et al. ............ | 709/225 |
| 6,859,878 B1 * | 2/2005 | Kerr et al. .................... | 713/183 |
| 7,165,118 B2 | 1/2007 | Ballinger et al. | |

(Continued)

OTHER PUBLICATIONS

Office Action from U.S. Appl. No. 12/058,844 mailed Mar. 31, 2011, 12 pages.

(Continued)

*Primary Examiner* — Hosuk Song
(74) *Attorney, Agent, or Firm* — Blakely, Sokoloff, Taylor & Zafman LLP (57) ABSTRACT

A software application executing in a first local operating environment may be used to connect to a remote server that requires a credential of a user to complete a transaction. In a second local operating environment that operates external to the first local environment, a user may be authenticated based on a user input received in the second local operating environment. The credential of the user may be securely communicated to the remote server from the second local operating environment. Other embodiments are described and claimed.

21 Claims, 6 Drawing Sheets

(56) References Cited

U.S. PATENT DOCUMENTS

| | | |
|---|---|---|
| 7,191,467 B1 | 3/2007 | Dujari et al. |
| 7,406,596 B2 | 7/2008 | Tararoukhine et al. |
| 7,689,699 B2 | 3/2010 | Chazin |
| 7,761,591 B2 | 7/2010 | Graham |
| 7,962,742 B2 | 6/2011 | Schwarz |
| 8,234,697 B2 * | 7/2012 | Chhabra ............... 726/6 |
| 2003/0177422 A1 | 9/2003 | Tararoukhine et al. |
| 2006/0080352 A1 | 4/2006 | Boubez et al. |
| 2006/0185021 A1 | 8/2006 | Dujari et al. |
| 2007/0053513 A1 | 3/2007 | Hoffberg |
| 2007/0074273 A1 * | 3/2007 | Linden ............... 726/3 |
| 2007/0136587 A1 | 6/2007 | Shvodian et al. |
| 2007/0180494 A1 | 8/2007 | Casey et al. |
| 2007/0198825 A1 | 8/2007 | Schwarz |
| 2009/0172388 A1 | 7/2009 | Maor |
| 2009/0248583 A1 | 10/2009 | Chhabra |
| 2011/0131275 A1 | 6/2011 | Maida-Smith et al. |
| 2012/0008786 A1 | 1/2012 | Cronk et al. |

OTHER PUBLICATIONS

Final Office Action from U.S. Appl. No. 12/058,844 mailed Sep. 15, 2011, 12 pages.

*"ID Vault Technology"* http://www.guardid.com/idvault/technology.php, print out Mar. 14, 2008.

Notice of Allowance from U.S. Appl. No. 12/058,844 mailed Mar. 29, 2012, 12 pages.

\* cited by examiner

METHOD, APPARATUS, AND SYSTEM FOR SENDING CREDENTIALS SECURELY

This application is a Continuation of, and claims the benefit of priority of, U.S. patent application Ser. No. 12/058,844, filed Mar. 31, 2008, now U.S. Pat. No. 8,234,697.

BACKGROUND OF THE INVENTION

Many secure web sites require some form of user identification and/or authentication as part of the log in process or as part of a transaction such as for example a payment transaction. Key loggers, root-kits and other malware may observe and capture the credentials entered by a user during one of these processes. Some solutions may require the presence of software or other mechanisms at the remote server or web host.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

In the following detailed description, numerous specific details are set forth in order to provide a thorough understanding of embodiments of the invention. However it will be understood by those of ordinary skill in the art that embodiments of the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

As used herein, the term "component" may refer to programming logic and associated data that may be employed to obtain a desired outcome. The term component may be synonymous with "module" or "agent" and may refer to programming logic that may be embodied in hardware or firmware, or in a collection of software instructions, possibly having entry and exit points, written in a programming language, such as for example C++, Intel Architecture 64 bit (IA-64) executable code, etc. Further, components may be callable from other components or from themselves, and/or may be invoked in response to detected events or interrupts. For example, a component may be a software package, module or agent executed by one or more processors.

As used herein, a credential may be a password, username, fingerprint, biometric identifier, user identification (ID) number, or other identifier, digital string, template, or other digitally encoded identifier as needed to confirm a user's authority for access to for example a software application or account. A credential may also be or include a digital identifier required to authorize the completion of a transaction. A transaction may also require more than one credential for completion. For example, a financial transaction may require a financial account number, a credit card number, a wire transfer number, etc. as well as a password, personal identification number and the like. Other types of credentials and transactions requiring different credentials are also possible.

Embodiments of the invention may provide a method and system for sending credentials or other data securely to a remote server according to an embodiment of the invention. In one embodiment, a software application executing in a first local operating environment may be used to connect to a remote server that requires a credential of a user to complete a transaction. In a second local operating environment that may operate securely, may be external to the first local operating environment, and may operate on the same computer as the first local operating environment, a user may be authenticated based on a user input received in the second local operating environment. The credential of the user may be securely communicated to the remote server from the second local operating environment.

In a second embodiment, a host operating environment may connect to a remote application that requires a credential for completion of a transaction. The remote application's supporting of the completion of the transaction from a secure local operating environment that operates external to the host operating environment may be confirmed. A string for completing the transaction may be received in the secure local operating environment via an out-of-band connection that is inaccessible to the host operating environment. In the secure local operating environment, a user's authorization to complete the transaction may be determined based on a user input to the secure local operating environment. If the user is authorized to complete the transaction, the out-of-band connection may be used to communicate securely the credential to the remote application.

Figure 1:
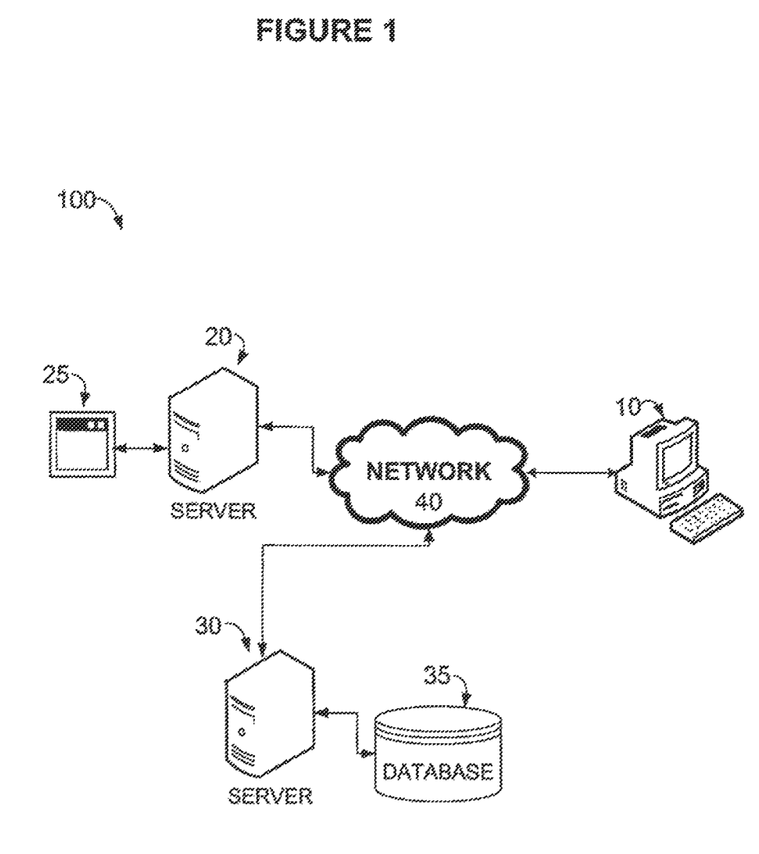
FIG. 1 is a schematic illustration of a system for sending credentials securely to a remote server according to an embodiment of the invention.

Reference is now made to FIG. 1, a schematic illustration of a system 10 capable of sending credentials securely to a remote server according to an embodiment of the invention. In some embodiments, system 10 may include at least a computing platform 10 connected to a remote server 20 and a database server 30 by a public network 40.

Remote server 20 may be or include any computer capable of hosting one of more applications 25 that may interact with a remote user such as may be using computing platform 10. Application 25 may include software applications that may be used or run remotely and that may require one or more transactions requiring the input of a user credential. For example, application 25 may be a software application requiring a user login transaction for access. Application 25 may also be a merchant application requiring a payment transaction for the purchase of an item. Other applications that include transactions requiring the input of one or more credentials are also possible.

In some embodiments, application 25 may present an interface unique to application 25. Alternatively, application 25 may also be capable of interacting with browsers or other applications for retrieving and viewing web content. In some embodiments, application 25 may be web-based or appear to the user as a web site or other interface with the login or user identification page appearing as a web page, a frame within a web page, and the like. Such web pages may be written in for example Hypertext Markup Language (HTML) or other suitable language as is known. Other network interfaces besides browsers are also possible.

In some embodiments, application 25 may require a remote user to submit a credential before completing a transaction. For example, if the transaction is a login, application 25 may require a remote user to login with or authenticate himself with a password, personal identification code, etc. prior to his gaining access to application 25. Login and authentication methods are well known in the art, but may be vulnerable to attack by hijackers and others when utilized in conjunction with a remote user connecting over a public network such public network 40. These attacks may include attacks at remote server 20 via public network 40 and at computing platform 10. Attacks targeting computing platform 10 may include keylogging, rootkits, spyware, and other malware. Further, some of these attacks may attempt to hijack one or more of a user's credential as it is being entered at computing platform using for example a keyboard or other device as known. Some embodiments may provide a user's credentials to a remote server securely without exposure to such attacks.

A user may access remote server 20 via for example computing platform 10 which may be, for example, a personal computer (PC), a desktop computer, a mobile computer, a laptop computer, a notebook computer, a terminal, a workstation, a server computer, a personal digital assistant (PDA) device, a network device, or other suitable computing device capable of or supporting, e.g. hosting software capable of interacting remotely with application 25. Although not limited in this respect, some embodiments of the present invention may incorporate a web browser as an application for retrieving and viewing web content. Such web browsers may retrieve content from the World Wide Web in a client-server dialogue of requests from the browser and responses from the web site or other interface.

Database server 30 may be a server capable of hosting a database 35 and may be remotely located from computing platform 10 and accessible over public network 40. Alternatively database server 30 may be accessible by computing platform 10 over a local area network or other localized connection. Database 35 may be or include a relational database or other application for storing and retrieving files or data such as for example hypertext transfer protocol (http) post or request strings for web site access. In some embodiments, database 35 may contain information listing web sites, remote servers, and applications which are capable of, e.g. which can support receiving securely transmitted credentials according to embodiments of the present invention. For each such listed web site or application, database 35 may also contain the corresponding command request string, e.g. a hypertext transfer protocol over secure socket layer (https) post string or other permission token, number or data or text string required for login.

Public network 40, which connects remote server 20 and computing platform 10 may be any publicly accessible network such as the Internet. Public network 40 may also be a local area network (LAN), metropolitan area network (MAN), wide area network (WAN) or other similar network with communications links between two or more network nodes, and may be a combination of networks. Access to public network 40 may be through wire line, terrestrial wireless, satellite or other systems well known in the art.

In some embodiments, the communication between computing platform 10 and remote server 20 may utilize a secure connection such as for example secure socket layer (SSL) and/or transfer layer security (TLS). Other techniques for securing the connection between computing platform 10 and remote server 20 may also be used. Although such technologies may prevent or deter the capture of sensitive data such as for example a user credential in transit, they may not provide protection for attacks at computing platform 10.

Figure 2:
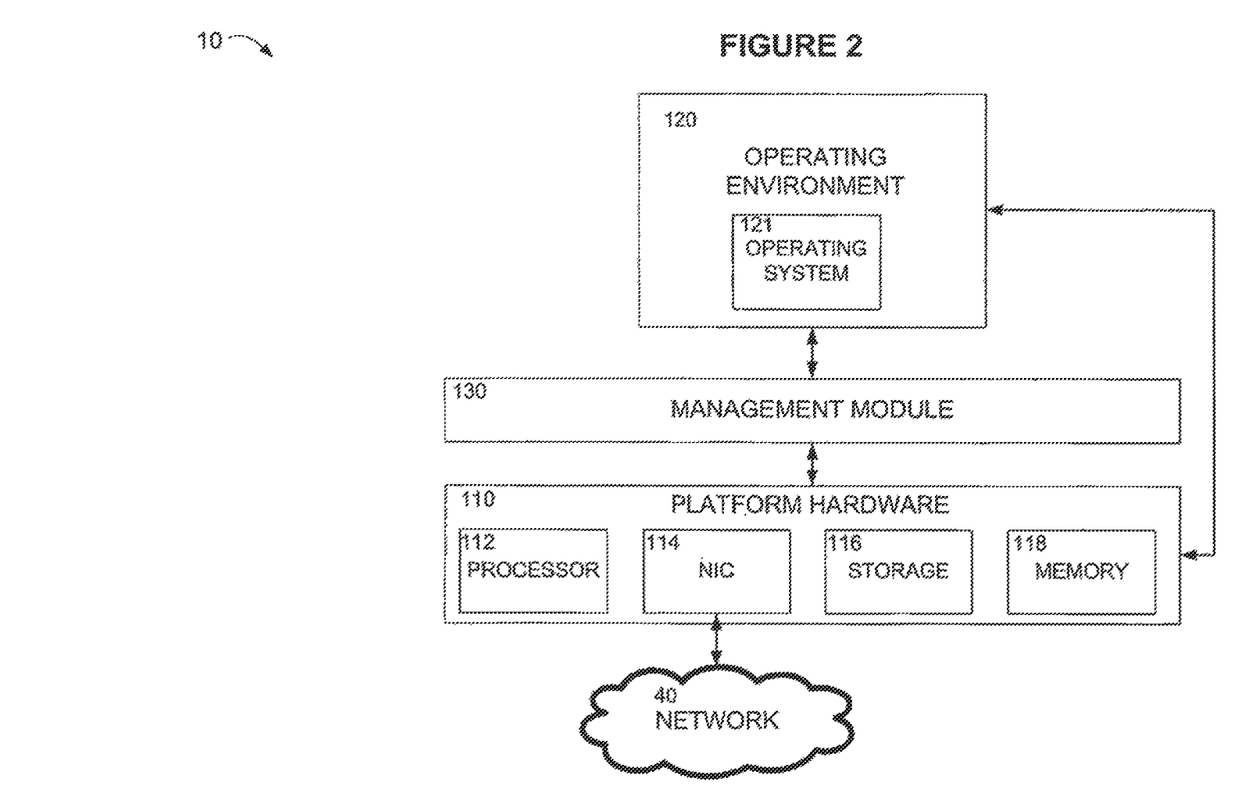
FIG. 2 is a representative illustration of a computing platform according to an embodiment of the invention.

Reference is now made to FIG. 2, a representative illustration of a computing platform 10 according to an embodiment of the invention. Although the invention is not limited in this respect, computing platform 10 may include for example platform hardware 110, an operating or executing environment 120 and management module 130. Computing platform 10 may also be connected to a network 40 for communicating with remote server 20 and other devices.

Although the invention is not limited in this respect, operating environment 120 and management module 130 may have direct connections to platform hardware 110. However, operating environment 120 and management module 130 may operate independently of each other and with respect to their access to platform hardware 110.

Platform hardware 110 may include a processor 112, a network interface controller (NIC) 114, storage 116, and/or memory 118. Other components and/or logical elements may also be included.

Processor 112 may be or include for example a central processing unit (CPU), a digital signal processor (DSP), a microprocessor, a controller, a chip, a microchip, or any suitable multi-purpose or specific processor or controller. In some embodiments, for example, processor 112 may execute programming instructions or perform calculation operations which may be used in the operation of components on computing platform 10.

Storage 116 may include integrated and/or peripheral storage devices, such as for example disks and associated drives, universal serial bus (USB) storage devices, flash memory, read-only memory (ROM), non-volatile semiconductor devices or other suitable storage devices for storing persistent content to be used for the execution of components on platform 10. In some embodiments storage 116 may be a storage resource physically part of platform 10 or it may be accessible by, but not necessarily part of, platform 10. For example, storage 116 may be accessed by platform 10 over public network 40 or other network not shown via NIC 114.

Memory 118 may include, for example, one or more memories such as a random access memory (RAM), a ROM, a dynamic RAM (DRAM), a synchronous DRAM (SDRAM), a Flash memory, a volatile memory, a non-volatile memory, a cache memory, a buffer, a short term memory unit, a long term memory unit, or other suitable memory units for storing data and or components such as an operating system and/or other software. In some embodiments, memory 118 may organize content stored therein into a number of groups of memory locations. These organizational groups, which may be fixed and/or variable sized, may facilitate the implementation of multiple operating environments. Alternatively, memory 118 may have a different organizational structure.

In some embodiments, operating environment 120 may be the domain of an executing operating system (OS) 121. OS 121 may be a software component such as for example a host OS configured to execute and control general operation of other components within operating environment 120, such as for example a software application. In some instances, operating environment 120 may provide a virtual operating environment in which the components may operate. Alternatively, operating environment 120 may be non-virtualized.

Management module 130 may arbitrate general component access to hardware resources such as for example one or more processors 112, NIC 114, storage 116 and/or memory 118. In some embodiments, management module 130 may be implemented using Intel® Active Management Technology (AMT) or other suitable technology for implementing out-of-band management of a computing platform by use for example of a secondary process, processor or controller. Management module 130 or portions of management module 130 may execute code independently from and may be securely isolated from operating environment 120. In some embodiments, management module 130 may present multiple abstractions and/or views of platform hardware 110, e.g. one or more processors 112, NIC 114, storage 116, and/or memory 118, to operating environment 120. Further, in some embodiments, management module 130 may be or include a second operating environment (e.g. with operating environment 120 as the first operating environment) that can execute instructions such as for example in firmware and may be for example a manageability engine (ME). In these instances, management module 130 may be for example an OS environment.

Management module 130 may be implemented in software (e.g., as a stand-alone program and/or component of a host operating system), hardware, firmware, as hardware architecture resident in firmware, and/or any combination thereof. A micro-controller within a chipset graphics and memory controller hub may house management module firmware although the invention is not limited in this respect. In some embodiments, management module 130 may be a microcontroller or embedded controller or processor. In some embodiments, management module 130 may be included in a chipset of platform hardware 110 and/or may be included in a memory controlled hub of platform hardware 110. In some embodiments management module 130 may be implemented inside a protected virtual environment running on for example processor 112, but independent of and protected from operating environment 120. Other implementations of management module 130 as an ME or otherwise are also possible.

Figure 3:
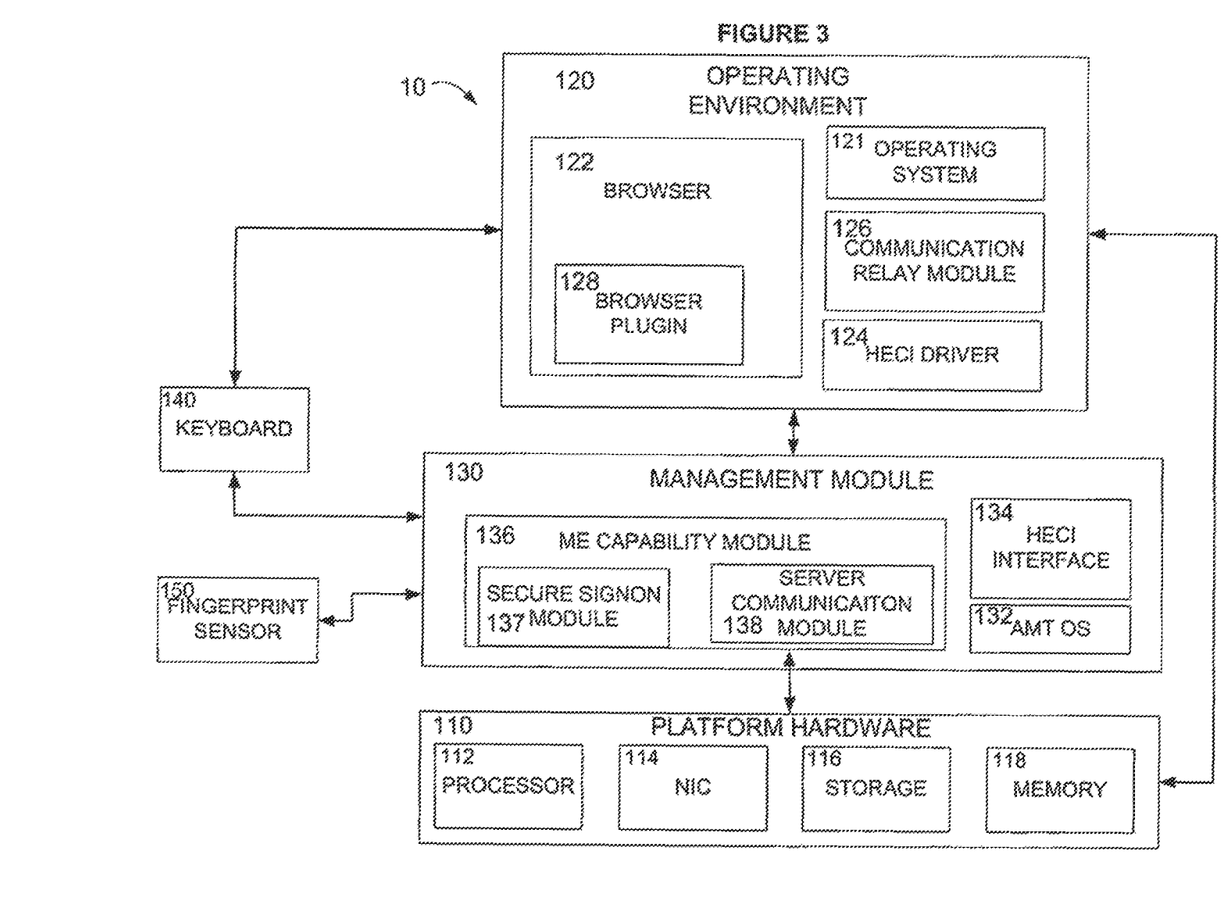
FIG. 3 is a further representative illustration of a computing platform according to an embodiment of the invention.

Reference is now made to FIG. 3, a further representative illustration of computing platform 10 according to an embodiment of the invention. In addition to platform hardware 110, operating environment 120, and management module 130, computing platform 10 may include input units such as a keyboard 140, fingerprint sensor 150, a mouse, etc.

In some embodiments, management module 130 may be or include an ME and may address critical manageability issues of computing platform 10, improve the efficiency of remote management and asset inventory functionality in third-party management software, safeguard the functionality of critical agents from failure of an operating system such as for example operating system 21, power loss, and intentional or unintentional client removal. Management module 130 may be capable of monitoring activity such as the heartbeat of a local management agent and automatically take remediation action. External systems may communicate with management module 130 hardware to perform diagnosis and recovery actions such as installing, loading or restarting agents, diagnostic programs, drivers and even operating systems. In some embodiments, the infrastructure of management module 130 may support the creation, setup, and configuration of interfaces for management applications as well as network security and storage administration. Management module 130 need not be or include an ME.

Management module 130 may include an AMT operating system (OS) 132, a Host Embedded Controller Interface (HECI) 134, and a management engine (ME) capability module 136. Other or different components or modules may also be included.

AMT OS 132 may be a local operating system designed to operate outside or separately from the host operating system, e.g. OS 121, and may support the functionality of management module 130.

HECI 134 may act as the interface between management module 130 and components of operating environment 120 such as for example OS 121. HECI 134 may be a bi-directional interface, e.g. transactions can be initiated either internal or external to management module 130.

ME capability module 136 may be implemented in firmware and/or software and may be responsible for exchanging data between management module 130 and devices or systems external to computing platform 10. In some embodiments, ME capability module 136 may include a secure sign-on module 137 and a server communication module 138. Other modules and components may also be included.

Secure sign-on module 137 may be responsible for managing the secure sign-on capability of management module 130, e.g. the input, storage, and retrieval of user credentials as well as other user input as needed for logging into a remote server or other external application. Secure sign-on module may be capable of communicating with external input devices such as for example keyboard 140 and/or fingerprint sensor 150. Server communication module 138 may manage the transmission of the user credentials and/or other data between management module 130 and a remote server such as for example remote server 20 or remote server 30. Because management module 130 may interface directly with NIC 114 and other components of platform hardware 110, transmission of information between management module 130 and an external device or server may occur external to operating environment 120 and, therefore, external to any applications running therein. Alternatively, management module 130 may communicate with external devices through operating environment 110 if such communications is protected from modification and snooping.

In some embodiments operating environment 120 may execute a browser 122 and may include a HECI driver 124 and a communication relay module 126. Other components or elements may also be included.

Browser 122 may be or include a web browser or other user agent as known for communicating with a remotely located web site or server-based application. Interfaces other than a browser accessing the World Wide Web may be used, and embodiments of the invention may allow secure access to systems other than those that are based on the World Wide Web (WWW). Browser 122 may include a browser plugin 128 that may be integrated into browser 122 or used with browser 122 when installed. In some embodiments, browser plugin 128 may be capable of detecting if a web site or other process or application is capable of receiving securely transmitted user credentials according to embodiments of the invention by for example contacting database server 30 and querying or looking up in the database 35 to see if the web site is included as a capable or supported web site. If the web site or application is supported, the corresponding command request string, e.g. a sign-on string and possibly other data may be sent securely to management module 130. Browser plugin 128 may, in some embodiments, inform management module 130 as to the domain name of the supported web site or application. Management module 130 may then retrieve the sign-on string using for example a TLS connection with endpoints at management module 130 and database server 30. Alternatively, browser plugin may retrieve the sign-on string directly for example in a cryptographically protected form and forward it to management module 130. Other secure transfer techniques are also possible.

Once a secure transaction has been completed, browser plugin 128 may also be capable of receiving session information such as for example cookies and other session identifiers from management module 130 for use during a session in operating environment 120.

HECI driver 124 may be or include a software interface that may manage communications between operating environment 120 and management module 134 through HECI interface 134. In some embodiments HECI driver 124 may utilize Intel® AMT subsystem (Management Engine) interface driver technology to access Intel® AMT capabilities.

Keyboard 140 may be or include a keyboard or other input device as known for text or data entry into computing platform 10. For applications running in operating environment 120 such as for example browser 122, the input from keyboard 140 may pass directly to operating environment 120. Keyboard 140 may also be used for text entry into management module 130, when a secure mode that directs the input from keyboard 140 exclusively into management module 130 is enabled. In some embodiments, other input devices such as a mouse or a microphone for voice commands may also be used instead of or in addition to keyboard 140.

Fingerprint sensor 150 may be or include a sensor for capturing a representation of a user's fingerprint for authentication or identification of a user. A digital template may be derived from the captured representation and compared with one or more stored reference digital templates. A positive match may authenticate or identify a user. In some embodiments, this matching process may occur within management module 134 in secure sign-on module 137. Alternatively, the matching process may occur at a remote server such as for example database server 30 with the digital template being communicated to the remote server in accordance with embodiments of the invention. Other locations for authenticating or identifying a user are also possible.

In some embodiments, computing platform 10 may include a device capable of capturing a representation of a different biometric identifier such as for example a retina scanner. Some embodiments may include a smart input device (SID) capable of receiving a direct input from a user. Other sensors and devices for authenticating or identifying a user as a direct input to management module 134 may also be used.

Figure 4:
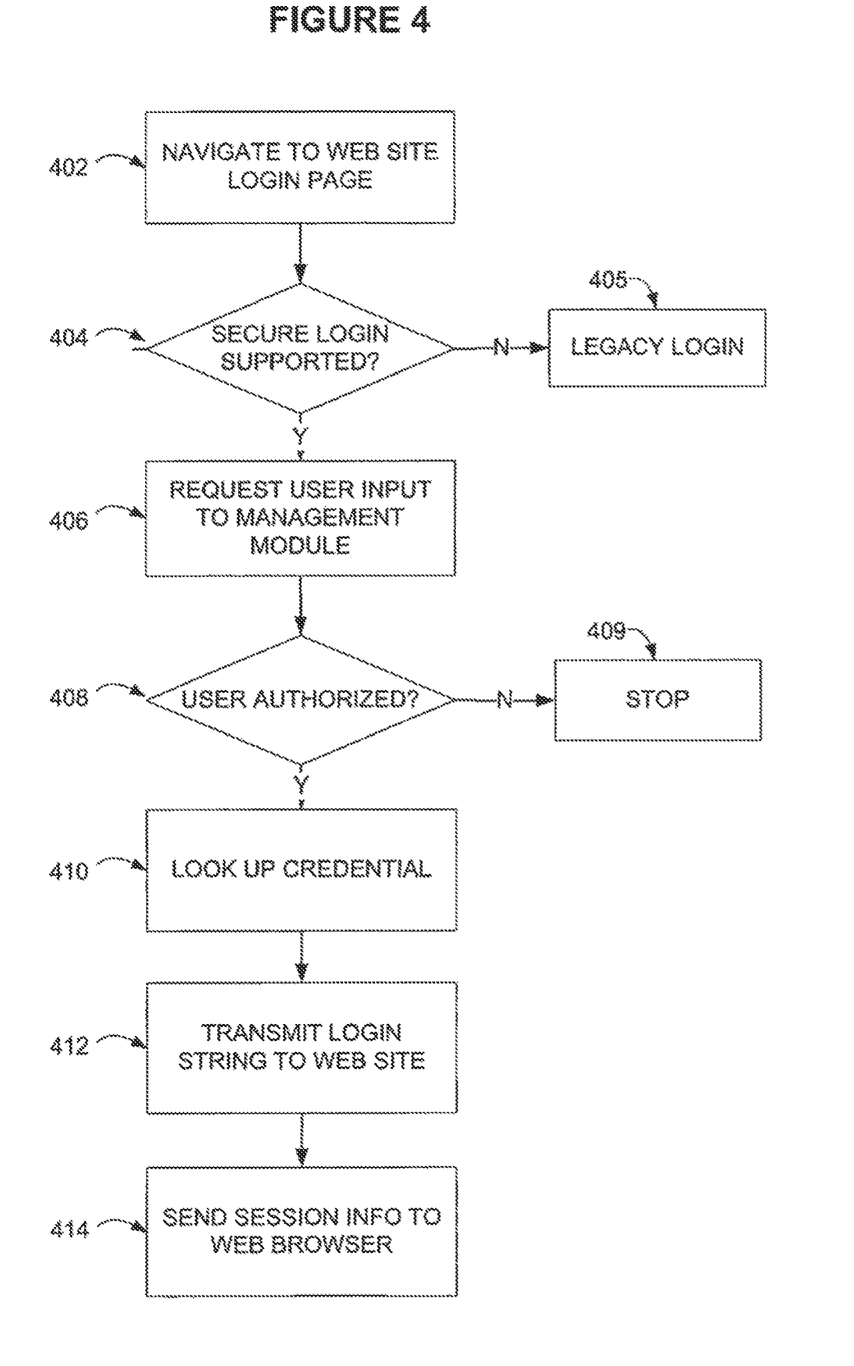
FIG. 4 is a flowchart of a method for sending credentials securely to a remote server according to an embodiment of the invention.

Reference is now made to FIG. 4 which is a flowchart of a method for sending credentials securely to a remote server according to an embodiment of the invention. Embodiments of the method may be used by, or may be implemented by, for example, computing platform 10 of FIG. 1, computing platform 10 of FIGS. 2 and 3, or by other suitable computing devices capable of hosting an environment such as executing environment 120 and management module 130 to communicate user credentials and/or other secure data over a public network such as public network 40 to a remote server such as remote server 20 for gaining access to or logging into for example application 25, although the invention is not limited in this respect. Other uses for the secure transmission of credentials and/or other data are also possible. While a management module and other specific components are shown as performing certain functions in FIGS. 4, 5 and 6, other modules, components, or other combinations of modules or components may perform these functions.

According to some embodiments of the invention, secure login and secure transmission of credentials for a transaction on web site or other interface may take place without any modification of the web site or application. Thus the invention may have advantages over prior art which may require additional software at the remote server for secure operations.

When a user navigates to a login page of application 25, e.g. a web site, a browser plugin on the user's computer (which may be for example computing platform 10) may check to see if application 25 login method can be performed securely according to an embodiment of the present invention by for example contacting a database server and querying the database. If application 25 login method is supported, e.g. can be performed securely, the database server may transmit a permission token, number or string such as a http post string required for login to application 25 directly to a management module of computing platform 10 that operates separately from the host operating system. This management module may prompt the user to confirm his identity by for example a fingerprint match or other process. If the management module verifies the identified user is authorized to access application 25, then the management module may retrieve a password or other credential and possibly encrypt and transmit a, for example, http post login string including the credential using for example a TLS or an SSL cryptographic protocol. The transmission may be encrypted within the management module and sent directly from the management module to application 25 to preclude any malware attacks through the browser or host operating system. Once the user has been logged into application 25, the management module may send the cookies and/or other session information received from application 25 to the web browser via the browser plugin, and the user may proceed with routine use of application 25.

As indicated at operation 402, a user using for example a browser such as browser 122 in operating environment 120 of computing platform 10 may navigate to the login page of a web site or other application such as for example application 25 hosted by for example remote server 20 over a public network such as public network 40. Alternatively, using a local client software application, computing platform 10 may automatically connect over a public network 40, or private network such as a LAN, to an application 25 that may require user login, the application 25 being hosted on remote server 20. Other connections and remote applications requiring login or other form of user verification are also possible.

In some embodiments, navigating to a login page or similar entry point for an application may initiate a login or other session as known. Subsequent interaction with the application, e.g. a web site, may include as part of the data stream one or more session identifiers and other session information such as for example cookies being sent from application 25 to computing platform 10. These cookies and other session information may be stored for further use in the present session as well as possibly for future sessions.

In operation 404, a browser plugin such as for example browser plugin 128 may check to see if the web site or remote application login method can be performed securely according to an embodiment of the invention, e.g. is supported. In some embodiments, browser plugin 128 may contact an external database server such as database server 35 via public network 40 to determine if application 25 is supported according to embodiments of the invention. Alternatively, the database or list of web sites/applications may be locally stored. Other techniques for confirming that a web site or application's login method is supported may be used with embodiments of the invention.

If the secure login method is not supported, login may proceed in any legacy method such as for example using a password or other text entry as known (operation 405). If the secure login method is supported, e.g. an entry referencing the remote application is in the database, database server 30 may transmit a permission token, number or string such as an http post login string needed for logging into application 25 directly to management module 130. Alternatively, database server 30 may transmit an encrypted permission token, number or string to browser 122. Browser plugin 128 may pass the encrypted data on management module 130. Because management module 130 may operate external to operating environment 120 and accordingly browser 122, the query or interrogation and/or response may be an out-of-band process, e.g. occurs external to operating environment 120.

Management module 130 through for example ME capability module 136 may request a user's input for authorization or authentication in operation 406. In some embodiments, a user may enter a password, user identification number or other such identifier with for example keyboard 140. Alternatively, the user may identify himself with a sensor such as for example fingerprint sensor 150 or other biometric device. Other devices for authorizing, authenticating, and/or identifying a user may also be used. Further, in some embodiments multiple inputs from more than one device may also be possible. Because the user's input passes directly to management module 130, the input process may be invisible to browser 122 and may be impervious to keyloggers and other attacks on operating environment 120.

Having received the user's input, management module 130 may, in operation 408, verify or confirm that the user is authorized to access application 25. This confirmation may include but is not limited to a table or database lookup, fingerprint matching, and other techniques as known for validating a user's identity and/or authority for access to an application. If the user is not authorized, the login process may end in operation 409. Alternatively, operations 406 and 408 may be repeated one or more times, possibly with a preset limit to the number of attempts to authorize.

If the user is authorized, management module 130 may look up in a table or database the appropriate identifier or credential needed for access to application 25 (operation 410). The table or database may be stored in any memory on computing platform 10 that is secure, e.g. confidentiality is protected (e.g., no access by operating environment 120 or any other entity other than management module 130). In some embodiments, this credential may be integrated into a login string for application 25. Other forms of credentials and login techniques may also be used.

In operation 412, management module 130 may transmit a permission token, number or string such as an http post login string and/or other appropriate credential to application 25 over public network 40. In some embodiments, management module may transmit an encrypted credential directly with application 25 outside of operating environment 120. This connection may be logically directly from management module 130 to remote server 20 over a TLS/https connection. The connection may be secure even if it uses the host (operating environment 120 and browser 122) Transmission Control Protocol/Internet Protocol (TCP/IP) stack. The encryption may alternatively use SSL or other cryptographic protocols or schemes as known to protect sensitive data in transit, that may be compatible with application 25 and/or other servers and web sites, and that protect the sensitive data from one end, e.g. remote server 20 to the other end, e.g. management module 130. Further, in some alternative embodiments, management module 130 may encrypt the credential and may send the encrypted credential via browser 122 to application 25.

Upon successfully signing into application 25, remote server may transmit session identifiers such as for example cookies back to management module 130. Management module 130 may send the received session information to browser 122 in (host) operating environment 120 via browser plugin 128 (operation 414) and may redirect browser 122 to the web site. At this point, the user's session may proceed using browser 122.

Other operations or series of operations may be used.

Figure 5:
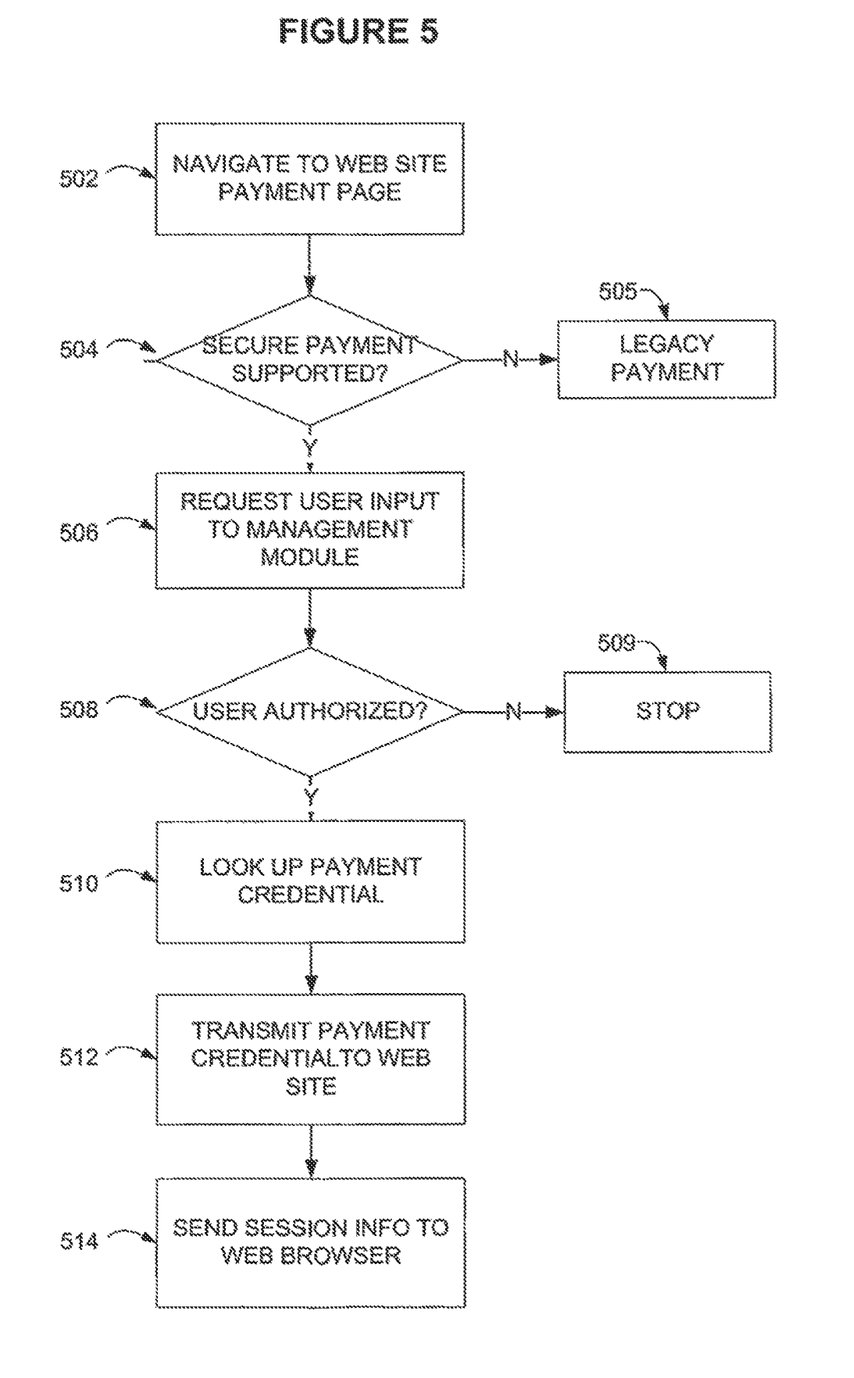
FIG. 5 is a flowchart of a method for a secure payment transaction according to an embodiment of the invention.

Embodiments of the present invention may also be used for other secure transactions beside login such as for example a merchant payment or other financial transaction or other transfer of sensitive data. Reference is now made to FIG. 5, which is a flowchart of a method for a secure payment transaction according to an embodiment of the invention. In some embodiments, some operations described below in the method of FIG. 5 may be similar to like-named operations described above for the method FIG. 4. Further, embodiments of the method of FIG. 5 may be used by, or may be implemented by, the same elements or components as the method of FIG. 4 including for example an application 25 that may require a financial transaction, although the invention is not limited in this respect.

In operation 502, a user desiring to complete a financial transaction on a web site such as for example payment to a merchant may navigate to the payment page or frame of the web site (which may be an interface to an application such as application 25). Alternatively, a user may be automatically redirected to a payment page or frame. Other techniques for requesting payment information from a user may also be used. The payment page may request the user to enter payment credentials as required to complete the financial transaction such as for example, a credit card number, a credit card expiration date, a security code, and the like. Payment credentials may also include payment account information such as for example bank account routing information and password, an on-line payment service (e.g. PayPal®) username and password, or other credentials that may identify or authorize a user and/or a financial account.

In operation 504, a process such as a browser plugin (e.g. browser plugin 128) may check to see if the web site's payment or other financial transaction can be performed securely according to an embodiment of the invention, e.g. is supported. Operation 504 may proceed as with operation 404, with browser plugin 128 contacting database server 30 or may employ other techniques for confirming web site transaction support as known.

If secure payment is not supported, a legacy payment method may be used in operation 505. If secure payment is supported, database server 30 may communicate for example an http request string or other such string as needed to complete a financial transaction with the web site to management module 130. In operation 506, management module 130 may request user input for authorization to complete the financial transaction. As with the embodiment of FIG. 4, user identification and authorization may use keyboard 140 and/or fingerprint sensor 150 or other authorization/authentication techniques as known. This authorization may occur with the secure environment of management module 130, e.g. inaccessible to browser 122.

In some embodiments, operations 508 and 509 may be substantially the same as operations 408 and 409. If the user is authorized, in operation 510 management module may look up the appropriate payment credential needed to complete the transaction. In some embodiments, a user may be able to select one of several options such as for example one of several credit cards for payment.

In operation 512, management module may encrypt and transmit the requisite http request string and payment credential over the public network 40 to application 25. As with operation 412, a logical connection directly from management module 530 to remote server 20 with a known encryption technique may provide sufficient security to prevent data hijacking or other attack. Upon verification of payment by application 25, management module 130 may send the session information it receives in response from application 25 to browser 122 via browser plugin 128 (operation 514) for subsequent redirection to the web site and continued use of browser 122. Other operations or series of operations may be used.

In some alternate embodiments, the secure operating environment may be external to computing platform 10 and may further include additional cryptographic software such as for example a Kerberos protocol. For these embodiments, the secure operating environment may be in a peripheral device or other smart input device (SID) that may for example connect to computing platform 10 through for example a USB port or other computer interface as known. Operations may proceed as with the embodiments of FIG. 4 and/or FIG. 5. However, user input and storage/retrieval of credentials may occur respectively through and internal to the SID, e.g. a user's input passes directly to the SID external to the (host) operating environment 120. Further, a cryptographic client such as for example a Kerberos client may reside within the environment of the SID. Credentials may then be encrypted with the Kerberos or other protocol before being passed through to the browser plugin for transmission to the remote server.

In some embodiments, management module 130 may require user entry of the credentials stored therein although the invention is not limited in this respect. Other techniques for loading credentials into management module 130 for storage or storing credentials in management module 130 external to operating environment 120 are also possible.

Figure 6:
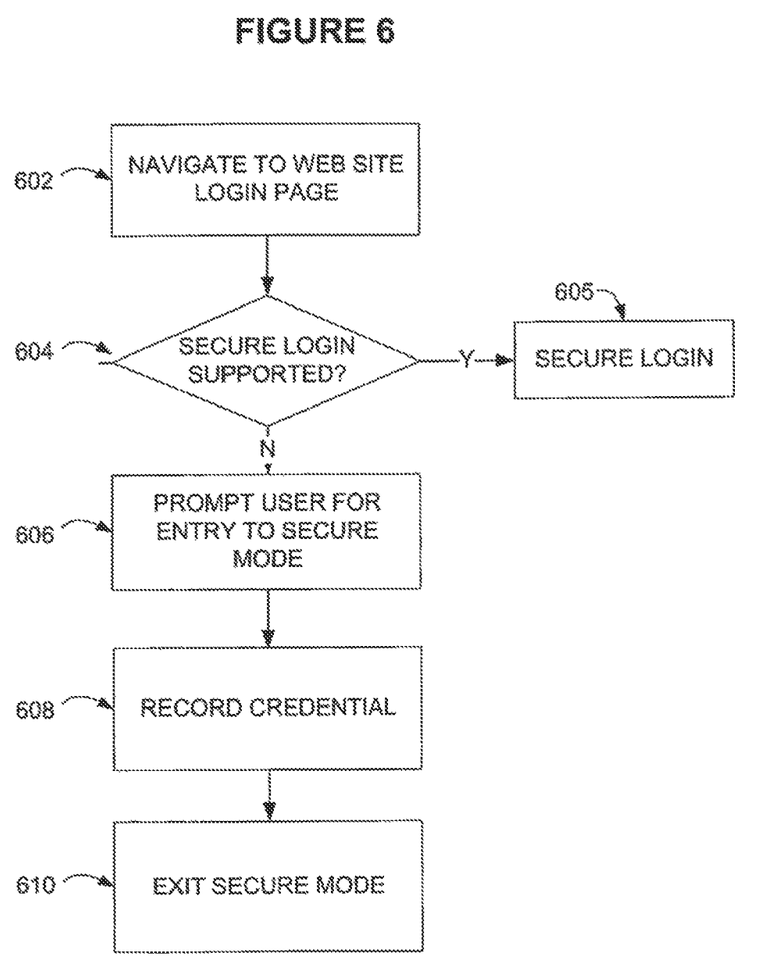
FIG. 6 is a flowchart of a method for accepting a credential in a secure operating environment according to an embodiment of the invention.

Reference is now made to FIG. 6 which is a flowchart of a method for accepting a credential in a secure operating environment such as management module 130 according to an embodiment of the invention. A credential may be requested for example when in operation 404 or similar operation it is determined that a web site or application may not currently support secure login according to embodiments of the invention. A similar request may be made for financial web sites and the like with respect to payment credentials. Other situations such as for example an initialization of management module 130 may also require the secure entry of a credential into management module 130.

In operation 602, a user may navigate to the login page of an application such as application 25 (e.g. a web site). If it is determined in operation 604 that secure login is supported, the method may proceed in operation 605 as with for example operations 406-414 or 506-514. If it is determined in operation 604 that secure login is not supported, then browser plugin 128 may prompt the user to enter a secure input mode (operation 606), e.g. direct communication between keyboard 140 and management module 130, but external to operating environment 120. In some embodiments, entry into secure input mode may require a user to press a specific combination of keys on for example keyboard 140. Alternatively, a specific button may be designated for secure input mode. Other triggers or actions to enter secure input mode are also possible.

Once keyboard 140 is in secure input mode, a user may enter a credential (e.g. a text credential) such as password, credit card number and the like. The entered credential may be recorded and stored by management module 130 in operation 608. A separate key combination may in operation 610 cause management module 130 to exit the secure input mode. Alternatively, management module 130 may exit secure input mode once the entered credential is recorded. Other techniques for exiting the secure input mode may also be used.

In some alternative or additional embodiments a user may be able to enter into secure mode directly without prompting by browser plugin 128. In these embodiments, the method may proceed with operations 608-610.

While the invention has been described with respect to a limited number of embodiments, it will be appreciated that many variations, modifications and other applications of the invention may be made. Embodiments of the invention may include a computer or processor readable storage medium, such as for example a memory, a disk drive, or a USB or other flash memory, including instructions which when executed by a processor or controller, carry out or perform methods disclosed herein. Embodiments of the present invention may also include other systems for performing the operations herein such as for example mobile computing platforms. Such systems may integrate the elements discussed, or may comprise alternative components to carry out the same purpose. It will be appreciated by persons skilled in the art that the appended claims are intended to cover all such modifications and changes as fall within the true spirit of the invention.

The invention claimed is:

1. A method comprising:
   connecting to a remote server using a software application executing in a first local operating environment;
   determining in the first local operating environment that the remote server requires a user credential to complete a transaction;
   requesting from the first local operating environment to a second local operating environment via a secure interface, that the second local operating environment authenticate the user credential to the remote server;
   authenticating with the second local operating environment the user credential in response to the request from the first local operating environment;
   communicating the user credential of the user to the remote server from the second local operating environment to initiate a secure session with the remote server; and communicating in the secure session from the first local operating environment with the remote server.

2. The method of claim 1, wherein the user credential is accessible only in the second local operating environment.

3. The method of claim 1, wherein the software application comprises a plugin to communicate with the second local operating environment.

4. The method of claim 1 comprising:
connecting to a database server using the first software application executing in the first local operating environment; and
in the second local operating environment, receiving from the database server a command request string for completing the transaction.

5. The method of claim 1, wherein authenticating further comprises accepting the user credential in the second local operating environment in a secure input mode not visible to the first local operating environment.

6. The method of claim 1, wherein the second local operating environment comprises a manageability engine.

7. The method of claim 1, comprising encrypting the user credential in the second local operating environment before the user credential is communicated to the remote server.

8. The method of claim 1, wherein the first and second local operating environments are executed by a same processing hardware device.

9. An apparatus comprising:
a computing platform to host a first local operating environment and a second local operating environment, the second local operating environment to operate external to the first local operating environment, the first operating environment to execute a first software application to connect to a remote server, to determine that the remote server requires a user credential to complete a transaction, and to request via a secure interface, and to request via a secure interface that the second local operating environment authenticate the user credential to the remote server, the second local operating environment to execute a second software application to authenticate the user credential in response to the request, and to communicate the user credential of the user to the remote server, wherein the first local operating environment is to communicate in the secure session with the remote server; and
an input device to collect the user input for reception in the second local operating environment.

10. The apparatus of claim 9, wherein the user credential is accessible only in the second local operating environment.

11. The apparatus of claim 9, wherein the software application comprises a plugin to communicate with the second local operating environment.

12. The apparatus of claim 9, wherein:
the first software application is to connect to a database server; and
the second software application to receive from the database server an https string for completing the transaction.

13. The apparatus of claim 9, wherein the second local operating environment is a manageability engine.

14. The apparatus of claim 9, wherein the first and second local operating environments are executed by a same processing hardware device.

15. A method comprising:
connecting to a remote application from a host operating environment;
determining with the host operating environment that the remote application requires a user credential for completion of a transaction;
determining that the remote application supports completing the transaction from a secure local operating environment, the secure local operating environment operating external to the host operating environment;
providing an out-of-band connection for the remote application to communicate with the secure local operating environment, the out-of-band connection being inaccessible to the host operating environment;
receiving in the secure local operating environment via the out-of-band connection a string for completing the transaction;
in the secure local operating environment, determining a user is authorized to complete the transaction based on a user input to the secure local operating environment, the user input received by the secure local operating environment in a secure input mode not visible to the host operating environment; and
in response to determining the user is authorized to complete the transaction, communicating the user credential to the remote application via the out-of-band connection.

16. The method of claim 15, wherein confirming comprises:
connecting to a database of supported applications; and
confirming an entry referencing the remote application is in the database.

17. The method of claim 15, comprising:
receiving in the secure local operating environment from the remote application session information after completing the transaction; and
passing the session information to the host operating environment.

18. A non-transitory processor-readable storage medium having stored thereon instructions that, if executed by a processor, cause the processor to perform a method comprising:
connecting to a remote server using a software application executing in a first local operating environment;
determining in the first local operating environment that the remote server requires a user credential to complete a transaction;
requesting from the first local operating environment to a second local operating environment via a secure interface, that the second local operating environment authenticate the user credential to the remote server;
authenticating with the second local operating environment the user credential in response to the request from the first local operating environment;
communicating the user credential of the user to the remote server from the second local operating environment to initiate a secure session with the remote server; and
communicating in the secure session from the first local operating environment with the remote server.

19. The processor-readable storage medium of claim 18, further comprising instructions that if executed by a processor, cause the processor to perform the method wherein the user credential is accessible only in the second local operating environment.

20. The processor-readable storage medium of claim 18, further comprising instructions that if executed by a processor, cause the processor to perform the method wherein the software application comprises a plugin to communicate with the second local operating environment.

21. The processor-readable storage medium of claim 18, wherein the instructions cause a processor device to execute both the first and second local operating environments.

\* \* \* \* \*